United States Patent
Suzuki

(10) Patent No.: US 10,552,717 B2
(45) Date of Patent: Feb. 4, 2020

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Tatsunori Suzuki, Toride (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/454,374

(22) Filed: Mar. 9, 2017

(65) Prior Publication Data

US 2017/0270393 A1  Sep. 21, 2017

(30) Foreign Application Priority Data

Mar. 16, 2016 (JP) .................. 2016-052594
Feb. 6, 2017 (JP) .................. 2017-019571

(51) Int. Cl.
H04N 1/04 (2006.01)
G06K 15/02 (2006.01)
H04N 1/23 (2006.01)

(52) U.S. Cl.
CPC ....... *G06K 15/1857* (2013.01); *G06K 15/184* (2013.01); *G06K 15/1813* (2013.01); *G06K 15/1822* (2013.01); *G06K 15/1851* (2013.01); *G06K 15/1855* (2013.01); *G06K 15/1896* (2013.01); *H04N 1/233* (2013.01); *G06K 2215/0011* (2013.01); *G06K 2215/0017* (2013.01); *H04N 2201/0094* (2013.01)

(58) Field of Classification Search
CPC ....................................... H04N 1/233
USPC ............................... 358/1.15, 1.13
See application file for complete search history.

(56) References Cited

U.S. PATENT DOCUMENTS 7,646,927 B2 * 1/2010 Matsubara ............. H04N 19/70
                                                                382/233
8,411,949 B2   4/2013 Kuroki
9,639,788 B2 * 5/2017 Kumarasamy ..... G06K 15/1836
(Continued)

FOREIGN PATENT DOCUMENTS

JP    2000-333018    11/2000
JP    2006-129207    5/2006
(Continued)

*Primary Examiner* — Fan Zhang
(74) *Attorney, Agent, or Firm* — Venable LLP

(57) ABSTRACT

An image processing apparatus uses a first rendering processor that performs rendering of a first area within a page based on print data and a second rendering processor that performs rendering of a second area within the page based on the print data. The image processing apparatus includes a controller, having a processor which executes instructions stored in a memory or having circuitry, being configured to acquire image data arranged across the first area and the second area based on the print data, cause the first rendering processor having accessed the image data to acquire all pixels of the image data and to perform rendering with pixels within the first area of all the pixels of the image data, and cause the second rendering processor having accessed the image data to acquire all the pixels of the image data and to perform rendering with pixels within the second area of all the pixels of the image data.

27 Claims, 12 Drawing Sheets

(56) References Cited

U.S. PATENT DOCUMENTS

2004/0196483 A1\* 10/2004 Jacobsen .............. H04N 1/0473
358/1.13

FOREIGN PATENT DOCUMENTS

| JP | 2011-158951 | 8/2011 |
| JP | 5879912 | 3/2016 |

\* cited by examiner

| | |
|---|---|
| DRAWING FRAME SETTING COMMAND<br>  COLOR SPACE = RGB<br>  GRADATION = 8BIT | 601 |
| DRAWING AREA SETTING COMMAND<br>  WIDTH = 4096PIX<br>  HEIGHT = 6144PIX | 602 |
| COMPRESSED IMAGE DECOMPRESSION COMMAND<br>  COMPRESSION FORMAT = JPEG<br>  DATA SIZE = 143664BYTE<br>  DATA INITIAL ADDRESS = 0x0160E460<br>  QUANTIZATION TABLE INITIAL ADDRESS = 0x0160E000<br>  IMAGE DATA SIZE AFTER DECOMPRESSION = 6291456BYTE<br>  IMAGE INITIAL ADDRESS AFTER DECOMPRESSION = 0x02000000<br>  IMAGE ID = 1 | 603<br>(CORRESPONDING<br>TO OBJECT 401) |
| COMPRESSED IMAGE DECOMPRESSION COMMAND<br>  COMPRESSION FORMAT = JPEG<br>  DATA SIZE = 57658BYTE<br>  DATA INITIAL ADDRESS = 0x0158B460<br>  QUANTIZATION TABLE INITIAL ADDRESS = 0x0158B000<br>  IMAGE DATA SIZE AFTER DECOMPRESSION = 3538944BYTE<br>  IMAGE INITIAL ADDRESS AFTER DECOMPRESSION = 0x02000000<br>  IMAGE ID = 2 | 604<br>(CORRESPONDING<br>TO OBJECT 402) |
| DRAWING COMMAND<br>  START COORDINATES = (256,2816)<br>  LEVEL COMBINATION = NOT PERFORMED<br>  FILL TYPE = BITMAP FILL<br>  IMAGE ID = 1<br>  PATH POINT SERIES = (256,2816),(256,3840),<br>                      (2304,3840),(2304,2816) | 605<br>(CORRESPONDING<br>TO OBJECT 401) |
| DRAWING COMMAND<br>  START COORDINATES = (2432,2816)<br>  LEVEL COMBINATION = NOT PERFORMED<br>  FILL TYPE = BITMAP FILL<br>  IMAGE ID = 2<br>  PATH POINT SERIES = (2432,2816),(2432,3840),<br>                      (3584,3840),(3584,2816) | 606<br>(CORRESPONDING<br>TO OBJECT 402) |
| COMPRESSED IMAGE DECOMPRESSION COMMAND<br>  COMPRESSION FORMAT = JPEG<br>  DATA SIZE = 114848BYTE<br>  DATA INITIAL ADDRESS = 0x0170E460<br>  QUANTIZATION TABLE INITIAL ADDRESS = 0x0170E000<br>  IMAGE DATA SIZE AFTER DECOMPRESSION = 6291456BYTE<br>  IMAGE INITIAL ADDRESS AFTER DECOMPRESSION = 0x02960000<br>  IMAGE ID = 3 | 607<br>(CORRESPONDING<br>TO OBJECT 403) |
| DRAWING COMMAND<br>  START COORDINATES = (1024,4608)<br>  LEVEL COMBINATION = NOT PERFORMED<br>  FILL TYPE = BITMAP FILL<br>  IMAGE ID = 3<br>  PATH POINT SERIES = (1024,4608),(1024,5632),<br>                      (3072,5632),(3072,4608) | 608<br>(CORRESPONDING<br>TO OBJECT 403) |
| PAGE END COMMAND | 609 |

FIG.6

IMAGE PROCESSING APPARATUS, CONTROL METHOD THEREOF, AND STORAGE MEDIUM

BACKGROUND OF THE INVENTION

Field of the Invention

The present invention relates to a band parallel rendering technique of print data.

Description of the Related Art

Conventionally, various techniques to increase the speed of rendering of a page of print data (PDL data) received from a host computer or the like have been proposed. For example, Japanese Patent Laid-Open No. 2011-158951 has disclosed an image processing apparatus in which one core generates intermediate data of one page from PDL data corresponding to the page for each band and a plurality of cores parallelly performs rendering of the intermediate data of different bands.

There is a case where PDL data includes image data as part of the component of a page. Further, there is a case where the image data such as this is arranged across a plurality of bands. In order to perform band parallel processing of image data across a plurality of bands by using the technique of Japanese Patent Laid-Open No. 2011-158951 described above, it is necessary to divide the image data for each band, generate intermediate data for each divided image corresponding to each band, and perform rendering. Consequently, the processing cost increases.

SUMMARY OF THE INVENTION

The image processing apparatus according to the present invention is an image processing apparatus that uses a first rendering unit configured to perform rendering of a first area within a page based on print data and a second rendering unit configured to perform rendering of a second area within the page based on the print data, and includes: a controller, having a processor which executes instructions stored in a memory or having circuitry, being configured to: acquire image data arranged across the first area and the second area based on the print data; cause the first rendering unit having accessed the image data to perform rendering with pixels within the first area of all pixels of the image data; and cause the second rendering unit having accessed the image data to perform rendering with pixels within the second area of all pixels of the image data.

Further features of the present invention will become apparent from the following description of exemplary embodiments (with reference to the attached drawings).

BRIEF DESCRIPTION OF THE DRAWINGS

FIG. 6 is a diagram showing intermediate data corresponding to PDL data;

DESCRIPTION OF THE EMBODIMENTS

In the following, with reference to the attached drawings, embodiments for embodying the present invention are explained. The configurations shown in the following embodiments are merely exemplary and the present invention is not limited to the configurations shown schematically.

(First Embodiment)

Figure 1:
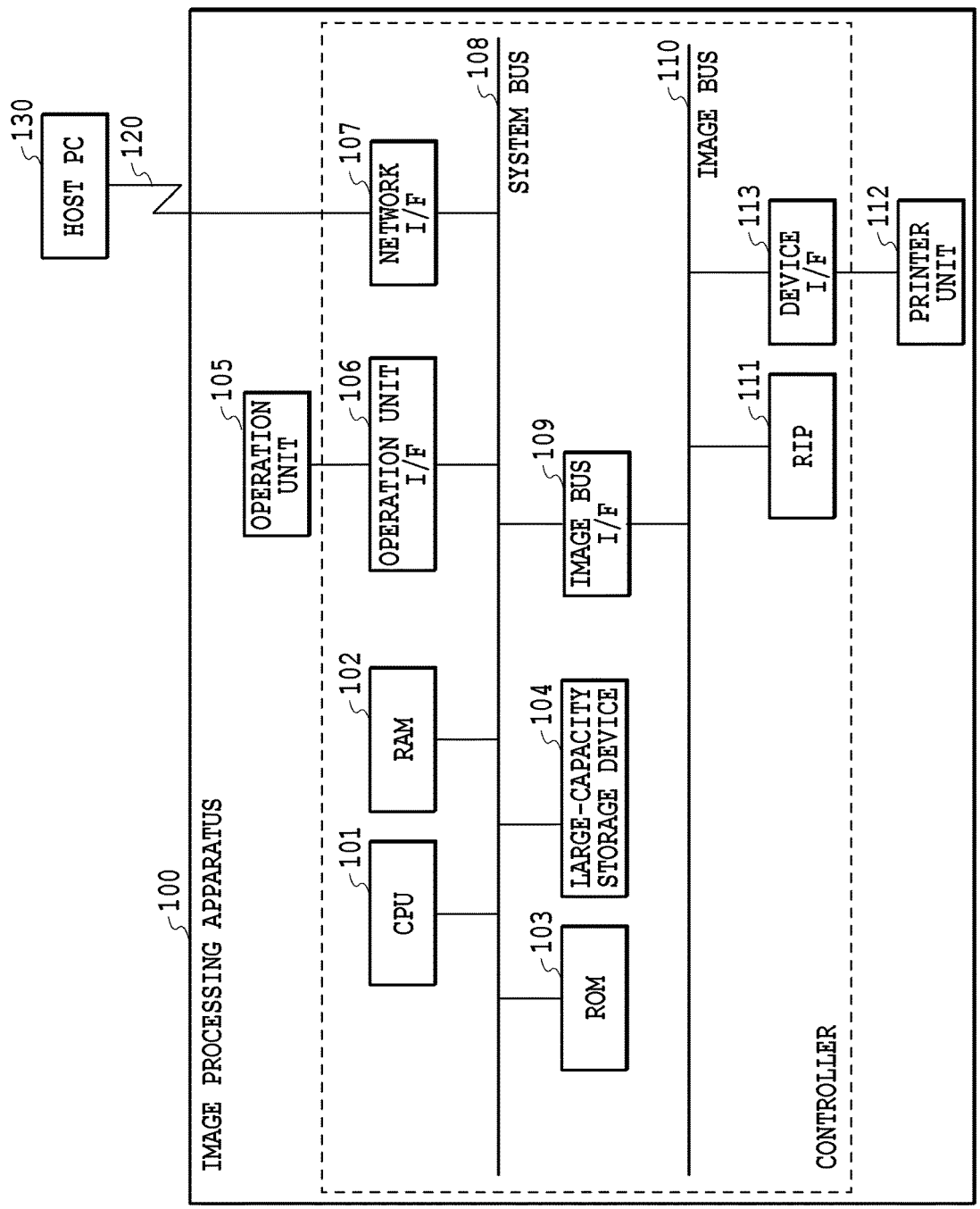
FIG. 1 is a diagram showing an example of a hardware configuration of an image processing apparatus.

First, a hardware configuration of an image processing apparatus according to the present embodiment is explained. FIG. 1 is a diagram showing an example of a hardware configuration of an image processing apparatus. An image processing apparatus 100 shown in FIG. 1 is connected with a host PC 130 via a LAN 120. A user who desires to perform printing generates a print job of a document to be printed in the host PC 130 and transmits the print job from the host PC 130 to the image processing apparatus 100 via the LAN 120. The print job includes data (PDL data) described in a page description language, which specifies how to arrange objects, such as text, image (photos), and graphics, within a page. Because of this, a print job is also called print data. Then, in the present embodiment, it is premised that a compressed image of a photo object is included within a page of the PDL data. Here, as the image processing apparatus 100, an SFP (Single Function Printer) that performs printing by performing parallel rendering for each band for intermediate data is supposed. However, the image processing apparatus may be an MFP (Multi Function Printer) including a plurality of functions, such as a function as a copy machine and a function as a FAX. It is possible to widely apply the method of the present embodiment to any apparatus having a function to perform printing by parallel rendering for each band for intermediate data. In the following, each unit making up the image processing apparatus 100 of the present embodiment is explained.

In FIG. 1, a broken line rectangle shows a controller unit and the controller unit includes a CPU 101, a RAM 102, a ROM 103, a large-capacity storage device 104, an operation unit I/F 106, a network I/F 107, a system bus 108, and an image bus 109. The CPU 101 is a processor that performs various kinds of arithmetic operation processing and is in charge of the control of the entire image processing apparatus 100. The RAM 102 is a system work memory for the CPU 101 to operate. Further, the RAM 102 is also used as a work area at the time of temporarily storing intermediate data generated by interpreting PDL data within a print job received from the host PC 130 and of performing rendering processing of intermediate data. The ROM 103 stores a boot program or the like of the system. The large-capacity storage device 104 is, for example, a hard disk drive and stores system software for various kinds of processing and a print job received from the host PC 130.

An operation unit 105 has a display for displaying various menus, print data information, etc., and buttons and keys for a user to perform various input operations and the operation unit 105 is connected with the system bus 109 via the operation unit I/F 106.

The network I/F 107 is an interface that transmits and receives various kinds of data and information to and from external devices including the host PC 130 via the LAN 120. Each of these units is connected to the system bus 108.

The image bus I/F 109 is an interface that connects the system bus 108 and an image bus 110 that transfers image data at a high speed and the image bus I/F 109 is a bus bridge that converts a data structure. To the image bus 110, a RIP(Raster Image Processor) 111 and a printer unit 112 are connected.

The RIP 111 includes a plurality of processors, a memory, a decompression processing circuit, etc., and converts a DL (display list), which is intermediate data generated from PDL data, into image data (bitmap image data) in a raster format based on instructions from the CPU 101. The printer unit 112 receives bitmap image data generated by the RIP 111 via a device I/F 113 and forms and outputs an image on a printing medium, such as paper. In the present specification, "rendering" means to generate image data in a raster format from a DL, which is intermediate data, and is the same as rasterizing.

Figure 2A:
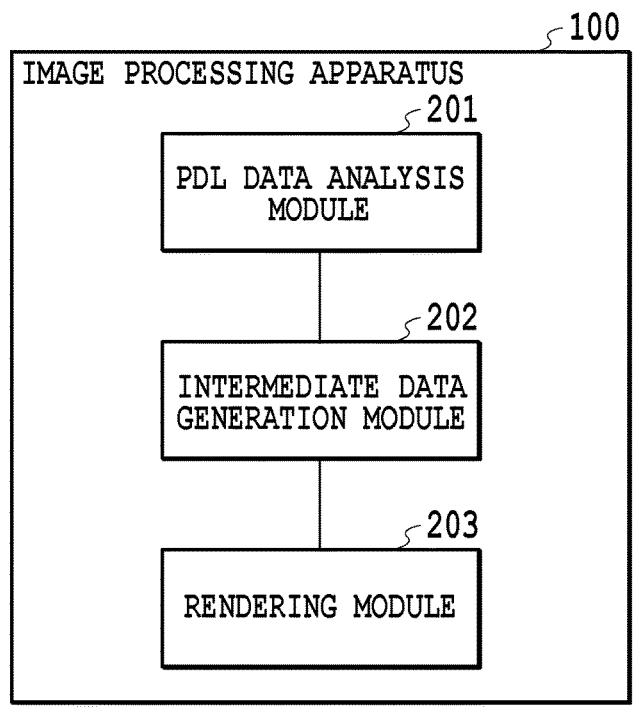
FIG. 2A is a block diagram showing a software configuration relating to printing processing of the image processing apparatus and FIG. 2B is a diagram showing a hardware configuration example of a RIP according to a first embodiment.

FIG. 2A is a block diagram showing a software configuration relating to printing processing of the image processing apparatus 100 and the image processing apparatus 100 includes a PDL data analysis module 201, an intermediate data generation module 202, and a rendering module 203.

The PDL data analysis module 201 analyzes PDL data included in a print job that is input from the host PC 130 and acquires page information and object information included in the page information. The acquired page information and object information are sent to the intermediate data generation module 202.

The intermediate data generation module 202 generates intermediate data (DL) including an object drawing command or the like based on the page information and the object information received from the PDL data analysis module 201. The generated intermediate data is sent to the rendering module 203.

Figure 2B:
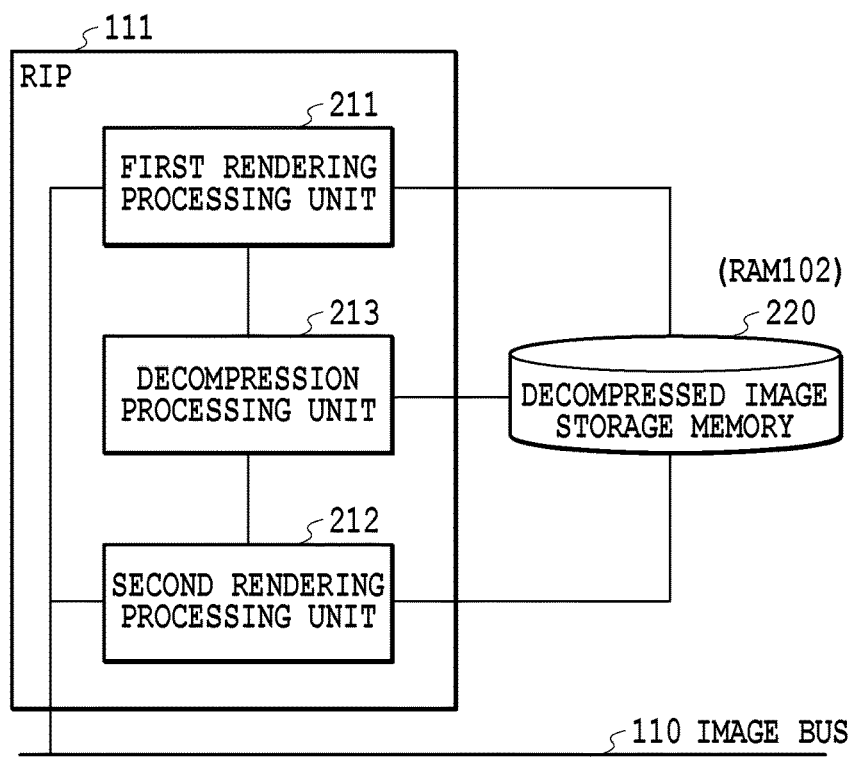

The rendering module 203 performs rendering in parallel for each band based on the generated intermediate data and generates bitmap image data for each page. FIG. 2B is a diagram showing a hardware configuration example of the RIP 111 according to the present embodiment, which enables parallel rendering for each band by the rendering module 203. The RIP 111 includes a first rendering processing unit 211, a second rendering processing unit 212, and a decompression processing unit 213 configured to decompress a compressed image included in intermediate data based on decompression instructions from the first rendering processing unit 211. The image data after being decompressed by the decompression processing unit 213 is stored in a decompressed image storage memory 220. Further, the decompression processing unit 213 has a register (not shown schematically) inside thereof and stores the number of decompression instructions for which the decompression processing has been completed (number of decompressed compressed images) of the received decompression instructions in the internal register. The numerical value stored in the internal register is initialized to "0" each time the processing for one page is completed. In the present embodiment, a configuration is supposed in which the PDL data analysis module 201 and the intermediate data generation module 202 are implemented by the CPU 102 using the RAM 102 in accordance with predetermined programs. However, it may also be possible to perform all the processes until PDL data is analyzed and bitmap image data is generated in a closed configuration within the RIP 111. Further, in the present embodiment, it is supposed that the previously described RAM 102 is used as the decompressed image storage memory 220, but it may also be possible to provide a dedicated memory for decompressed image storage separately from the RAM 102.

(Explanation Of Terms)

Here, each term of "edge", "scan line", "span", "level", "fill", and "band" that appear in the rendering processing of the present embodiment is reviewed.

An edge refers to the boundary between objects existing within a page or the boundary between an object and a background. That is, an edge is an outline of an object.

A scan line is a line in a main scanning direction in which image data within a memory is scanned continuously in image forming processing. The height of a scan line is one pixel.

A span refers to the section between edges in a single scan line. This section is also called a closed area.

A level is information indicating a position relationship in depth between objects to be drawn within a page and a different level number is allocated without exception to each object. A level is also called a Z order and indicates the arrangement order of objects along the direction from the backside of a page toward the front side of the page (direction perpendicular to an XY-plane in the case where the drawing range of a page is represented in the XY-plane: Z-axis direction).

A fill is fill information for a span and there exists a fill having a different color value for each pixel, such as bitmap image data and shading, or a fill in which the color value does not vary within a span, such as a solid fill. Consequently, for one span (closed area), the levels exist in the number corresponding to the number of objects related to the span and there are different fills in the number corresponding to the number of levels. Further, in the case where bitmap image data is specified as a fill, the bitmap image data is stored in advance in the RAM 102. In the case where a compressed image is included in PDL data, before the RIP 111 refers to as a fill, the bitmap image data after decompression is stored at a predetermined position on the RAM 102.

A band refers to a bundle of a plurality of scan lines.

Figure 3:
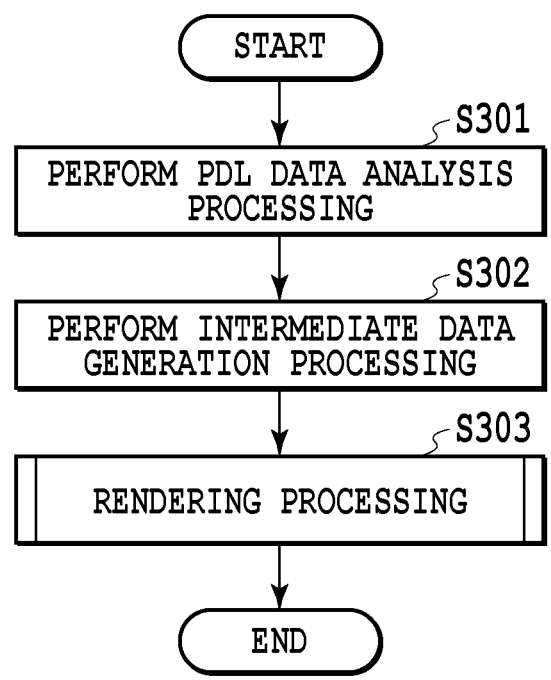
FIG. 3 is a flowchart showing a flow until bitmap image data is generated from a print job.
Figure 4:
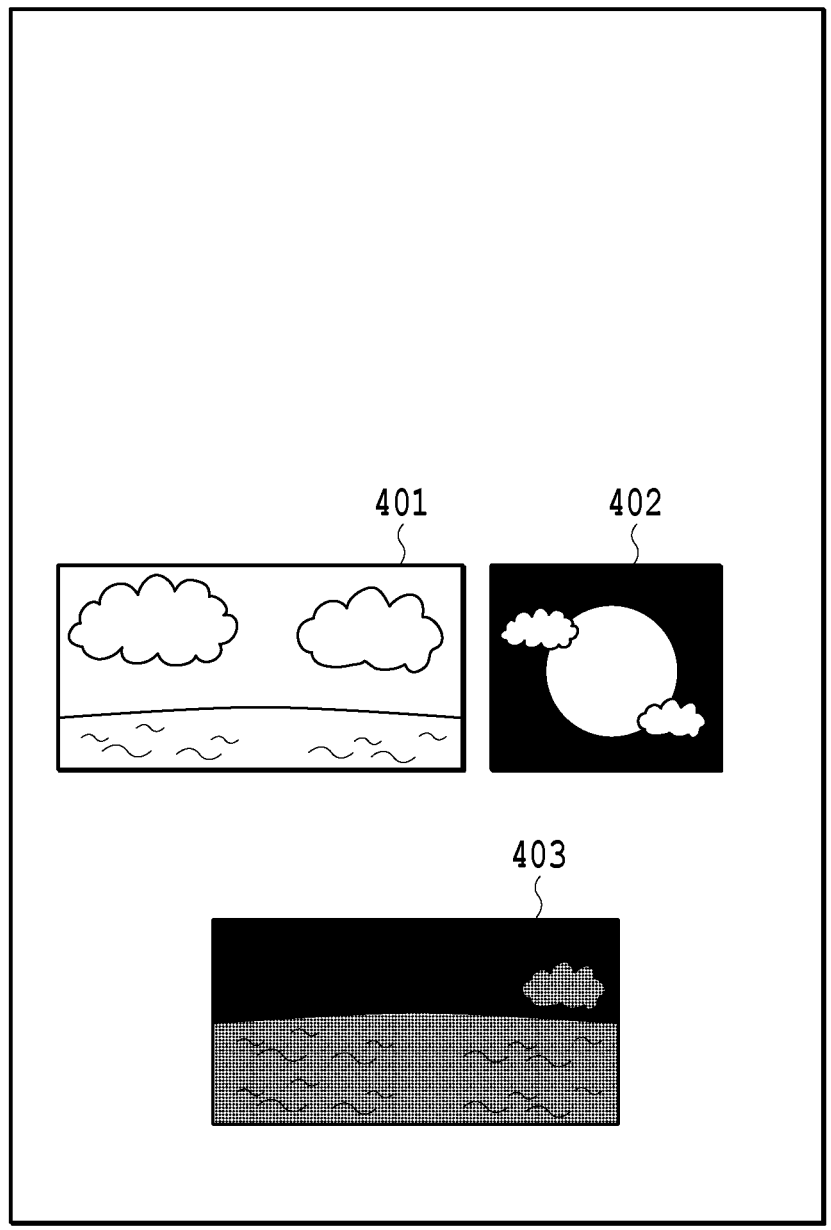
FIG. 4 is a diagram showing an example of a page including a compressed image.

Subsequently, a rough flow of processing until bitmap image data is generated from a print job is explained. FIG. 3 is a flowchart showing a flow until bitmap image data is generated from a print job. In the following, explanation is given on the assumption that a print job of a page including compressed images of objects 401 to 403 with an image (photo) attribute as shown in FIG. 4 is transmitted from the host PC 130. In the case of the present embodiment, division of data of a print job is not performed in advance for the purpose of parallelly performing rendering processing at step 303, to be described later.

Figure 5:
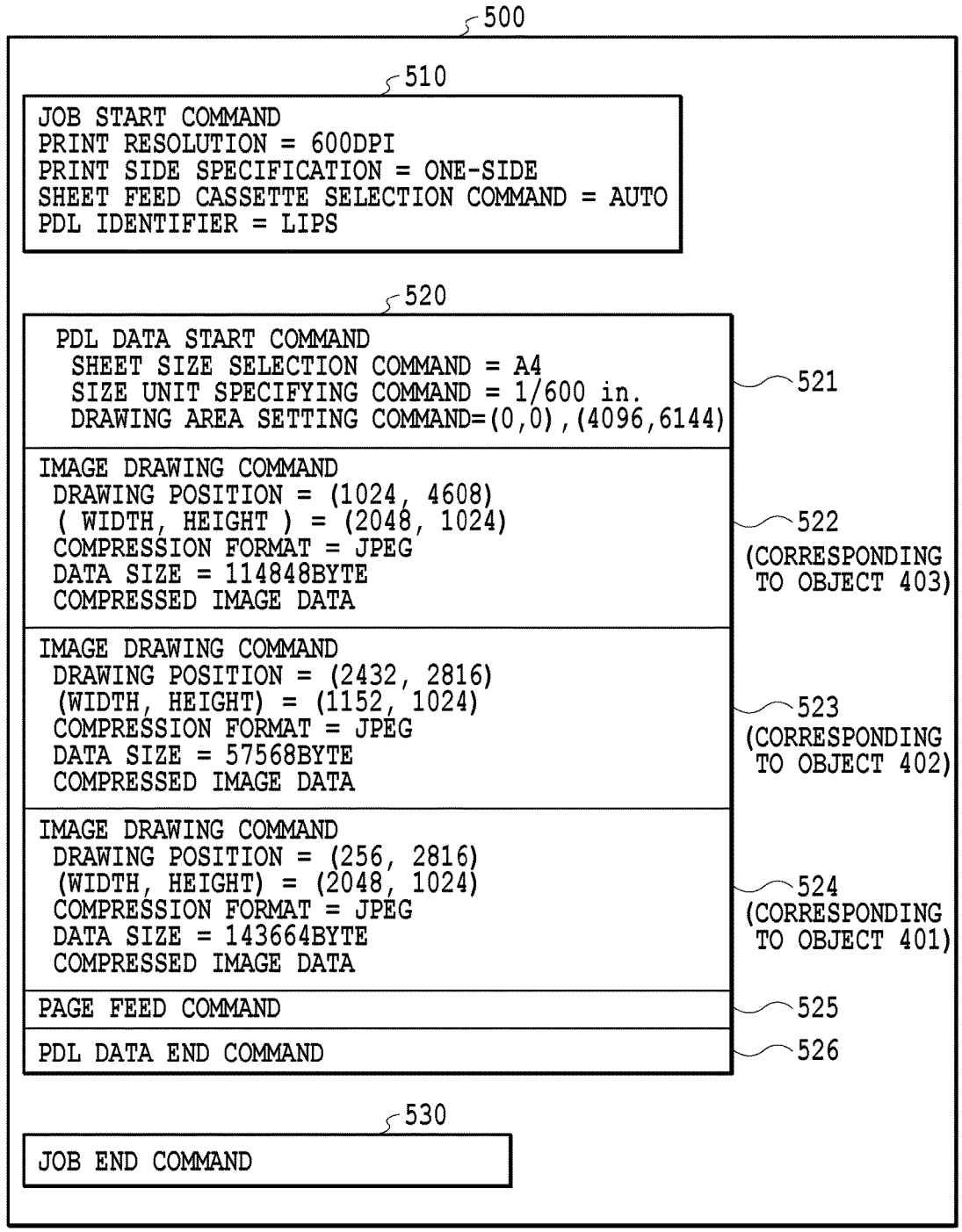
FIG. 5 is a diagram showing a print job corresponding to the page in FIG. 4.

At step 301, the PDL data analysis module 201 analyzes the PDL data corresponding to the page in FIG. 4 within a print job received from the host PC 130. FIG. 5 shows the print job corresponding to the page in FIG. 4.

A print job 500 includes a job start command 510 indicating the start of the print job, PDL data 520 specifying an image to be printed, and a job end command 530 indicating the end of the print job. The job start command 510 includes print resolution information to set a resolution at the time of printing processing of the PDL data 520, print side specifying information to specify one-side/both-side printing, a sheet feed cassette selection command to specify a sheet feed cassette, and a PDL identifier to indicate the type of the PDL data 520. Although omitted in the present embodiment for simplification, the job start command 510 also includes a command to specify a margin position to bind sheets, a command to select a sheet discharge port, etc. Further, the job start command 510 may also include various commands that can be set by the operation unit 105 in addition to the printing environment described above. The PDL data 520 includes six commands in all: a PDL data start command 521, image drawing commands 522 to 524, a page feed command 525, and a PDL data end command 526. The PDL data start command 521 indicates the start of the PDL data 520 and includes a sheet size selection command to select a sheet size of each page, a unit specifying command to specify the unit used in the drawing command, and a drawing area setting command to indicate an area in which the drawing command is valid. The image drawing command 522 is a drawing command corresponding to the object 403 in the page in FIG. 4 and includes the drawing position, the width and height of the object, the compression format, the data size of the compressed image, and the compressed image data. Here, the drawing position means the coordinates (the same as drawing start coordinates, to be described later) of the start point at which a target object is drawn in the case where the top-left corner of a page is taken to be the origin (0, 0). Similarly, the image drawing command 523 is a drawing command corresponding to the object 402. Further, the image drawing command 524 is a drawing command corresponding to the object 401. The page feed command 525 is a command to indicate that the subsequent drawing command is for the next page. Then, the PDL data end command 526 is a command to mean the end of the PDL data.

Explanation is returned to the flow in FIG. 3.

At step 302, the intermediate data generation module 202 generates intermediate data (DL) necessary for bitmap image data generation based on information on the analyzed PDL data. For generation of intermediate data, a publicly known technique may be applied. FIG. 6 shows the intermediate data corresponding to the PDL data 520 of the print job 500 shown in FIG. 5. Intermediate data 600 shown in FIG. 6 includes nine commands in all: a drawing frame setting command 601, a drawing area setting command 602, compressed image decompression commands 603, 604, and 607, drawing commands 605, 606, and 608, and a page end command 609. In the example of the page in FIG. 4, as intermediate data of the image drawing command 524, the compressed image decompression command 603 and the drawing command 605 are generated. Similarly, as intermediate data of the image drawing command 523, the compressed image decompression command 604 and the drawing command 606 are generated. Then, as intermediate data of the image drawing command 522, the compressed image decompression command 607 and the drawing command 608 are generated. Further, at this step, in the case where the intermediate data is generated, by referring to the drawing position of the image drawing command included in the PDL data 520, the drawing commands of the intermediate data corresponding to the respective image drawing commands are sorted. Specifically, the drawing start coordinates of the drawing commands included in the intermediate data are sorted first so that the Y-coordinates are arranged in the ascending order and then the drawing commands whose Y-coordinate of the drawing start coordinates is the same are sorted so that the X-coordinates are arranged in the ascending order. Further, in this sort processing, in the case where the drawing command is a drawing command for a compressed image, the corresponding compressed image decompression command is inserted immediately before the drawing command. The reason the compressed image decompression command is inserted immediately before the drawing command is to save the RAM 102 that stores image data after decompression as much as possible by bringing the decompression of a compressed image into the standby state until immediately before the execution of the drawing command. For the drawing commands of a compressed image whose Y-coordinate of the drawing start coordinates of the drawing command after the sort is the same, a plurality of corresponding compressed image decompression commands is inserted before the plurality of drawing commands respectively. By sorting the drawing commands included in the intermediate data as described above, in the rendering processing, it is possible to perform rendering (also referred to as scan line rendering) in the order of the pixel from the start point of a page (i.e., the origin whose X-coordinate and Y-coordinate are both "0").

In the intermediate data 600 shown in FIG. 6, the drawing frame setting command 601 is a command to specify a color space and gradation. The drawing area setting command 602 is a command to specify the width and height of a page image. The compressed image decompression command 603 is a decompression command of a compressed image corresponding to the image drawing command 524 in the PDL data 500. In the compressed image decompression command 603, the initial address of a reference destination of compressed image data included in the image drawing command 524, the initial address of a reference destination of a quantization table used for decompression processing, and information on the data size necessary to store image data after decompression are described. The data size necessary to store image data is calculated based on the color space and the width and height of the image. The compressed image decompression command 604 is a decompression command of a compressed image corresponding to the image drawing command 523, which is generated similarly. Further, the compressed image decompression command 607 is a decompression command of a compressed image corresponding to the image drawing command 522. The drawing command 605 indicates a drawing command of an image that is decompressed in accordance with the compressed image decompression command 603 and includes the drawing start coordinates, a path point series (each of the coordinates of the vertexes indicating the drawing area), and information to indicate whether or not to perform level (color) combination processing. In the present embodiment, within the drawing area of the drawing command 605, only one image is drawn and combination with an image located on the backside or on the frontside does not take place, and therefore, the level combination is "not performed". The drawing command 606 is a drawing command of an image that is decompressed by the compressed image decompression command 604, which is generated similarly. Further, the drawing command 608 is a drawing command of an image that is decompressed by the compressed image decompression command 607, which is generated similarly. Then, the page end command 609 is a command to indicate the end of the page. As described above, the intermediate data is generated by sorting object information acquired by analyzing the PDL data in the order of appearance on a scan line. Consequently, the order of the drawing command of the PDL data 500 shown in FIG. 5 is different from that of the intermediate data 600 shown in FIG. 6. That is, in the PDL data 500, the drawing command 522 corresponding to the object 403 is located first, but in the intermediate data 600 shown in FIG. 6, the drawing command 605 corresponding to the object 401 nearest to the origin (0, 0) is located first.

Further, the intermediate data is generated so that the area within the RAM 102 as the decompressed image storage memory 220 secured for compressed image decompression by the RIP 111, which is referred to for processing of a drawing command, is cleared at the time of the completion of the processing of the drawing command. That is, in the intermediate data 600 in FIG. 6, the order of each command is determined so that the compressed image decompression commands 603 and 604 are located before the drawing commands 605 and 606 and the compressed image decompression command 607 is located before the drawing command 608. Due to this, it is made possible for the RIP 111 to refer to the image after decompression that is necessary at the point in time of processing the drawing commands 605, 606, and 608 and to process the compressed image decompression command 607 after the completion of the processing of the drawing commands 605 and 606 and the disposal of the decompression results of the compressed image decompression commands 603 and 604.

Explanation is returned to the flow in FIG. 3.

At step 303, the rendering module 203 performs rendering in parallel for each band by using each of the processing units 211 to 213 in FIG. 2B based on the intermediate data generated at step 302 and generates bitmap image data. The band parallel rendering processing, which is the feature of the present embodiment, will be explained again in another section.

The above is a rough flow until bitmap image data is generated from a print job.

(Band Parallel Rendering Processing)

Figure 7:
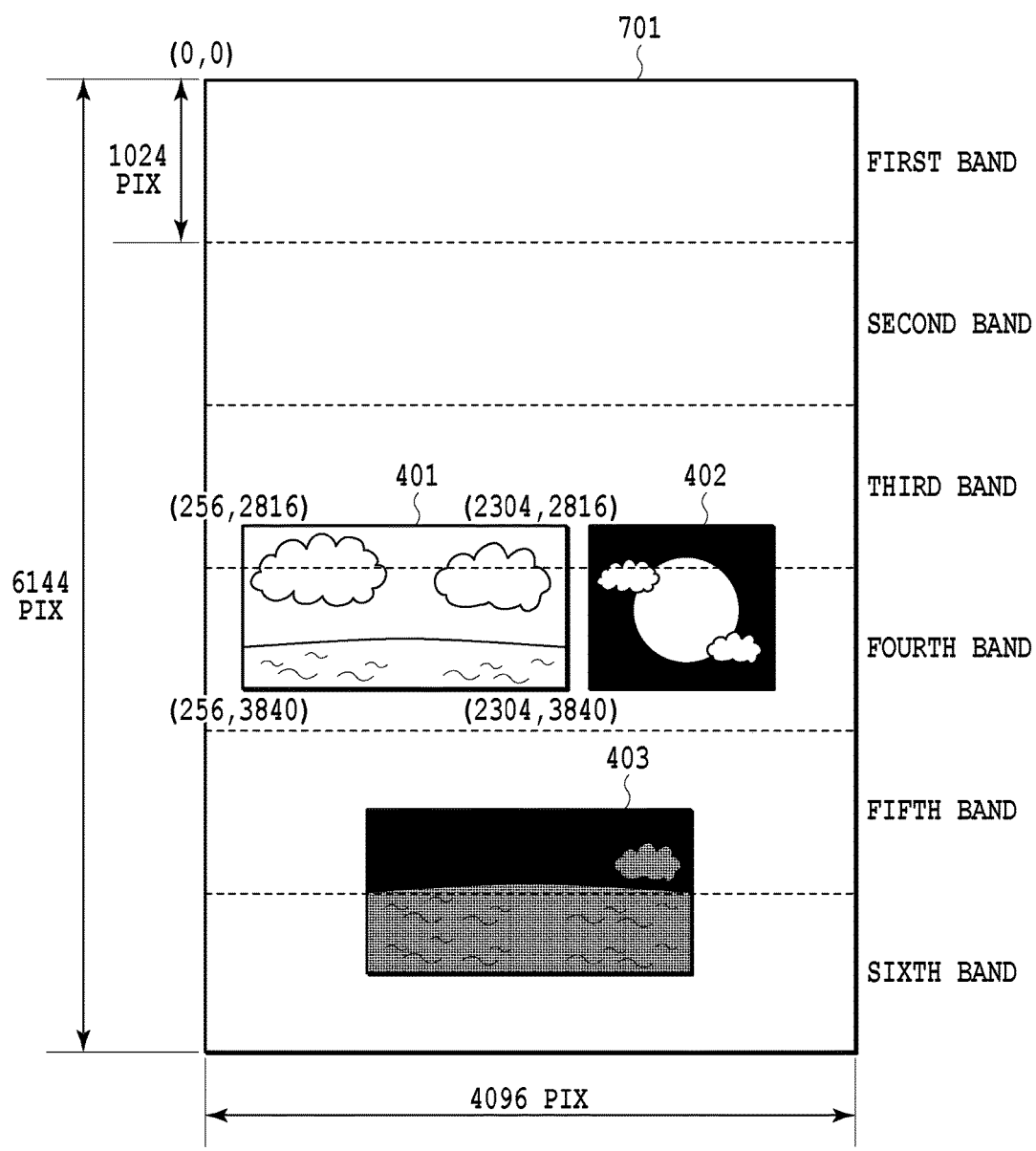
FIG. 7 is a diagram explaining a process to perform rendering processing in parallel for each band.

In the following, a method of performing rendering in parallel for each band by causing the first rendering processing unit 211 and the second rendering processing unit 212 to cooperate with each other is explained in detail. In the following, it is assumed that one band is a set of 1,024 scan lines and the band located at the uppermost portion of a page is the first band. FIG. 7 is a diagram explaining a process to perform rendering processing in parallel for each band based on the intermediate data in FIG. 6. The rendering module 203 generates a bitmap image for each scan line in the order from the top portion of the page based on the intermediate data in FIG. 6. At this time, the page is divided into predetermined band areas (here, bundles of 1,024 scan lines) and a bitmap image is generated by the first rendering processing unit 211 for an odd-numbered band area and a bitmap image is generated by the second rendering processing unit 212 for an even-numbered band area. In this manner, the first rendering processing unit 211 and the second rendering processing unit 212 operate in parallel while analyzing the intermediate data of the entire page and perform rendering of band areas allocated thereto, respectively.

(First Rendering Processing)

Figure 8:
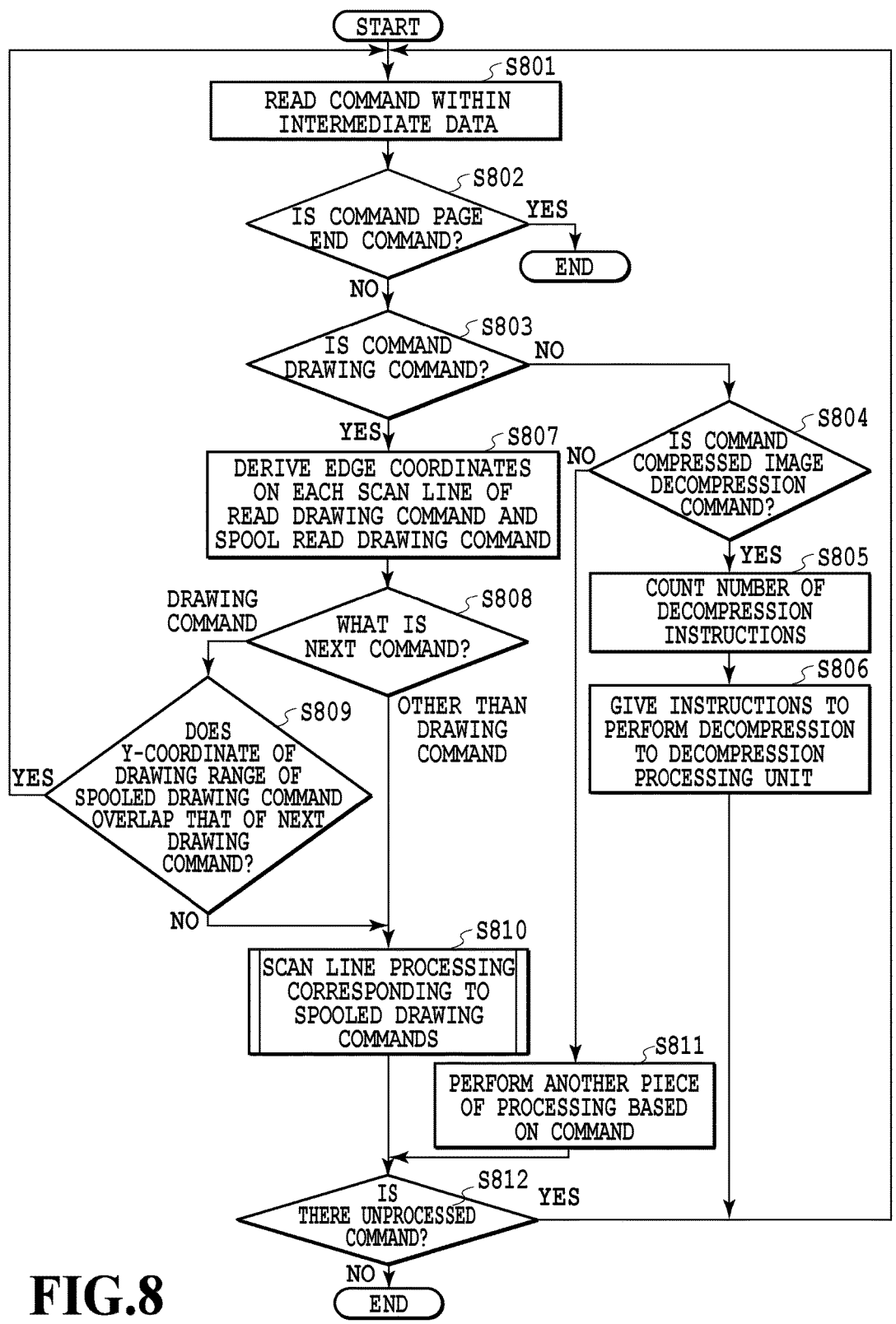
FIG. 8 is a flowchart showing a flow of first rendering processing.

To begin with, rendering processing (first rendering processing) of the first band (here, odd-numbered band) that the first rendering processing unit 211 is in charge of is explained. FIG. 8 is a flowchart showing a flow of the first rendering processing according to the present embodiment.

At step 801, the first rendering processing unit 211 reads one command included in the intermediate data generated at step 302. Which of the commands included in the intermediate data is read is managed by a pointer and the commands are read in the order form the initial command. On the completion of the read of the command pointed at by the pointer, the pointer moves to the next command. In this manner, the commands included in the intermediate data are read sequentially.

At step 802, the first rendering processing unit 211 determines whether the command read at step 801 is the page end command. In the case where the read command is not the page end command, the processing proceeds to step 803. On the other hand, in the case of the page end command, the present processing is terminated.

At step 803, the first rendering processing unit 211 determines whether the command is a drawing command to specify drawing of an object. In the case where the read command is not a drawing command, the processing proceeds to step 804. On the other hand, in the case of a drawing command, the processing proceeds to step 807.

At step 804, the first rendering processing unit 211 determines whether the command read at step 801 is a compressed image decompression command. In the case where the read command is a compressed image decompression command, the processing proceeds to step 805. On the other hand, in the case where the read command is not a compressed image decompression command, the processing proceeds to step 811.

At step 805, the first rendering processing unit 211 counts the number of read compressed image decompression commands (number of decompression instructions). Each time a decompression command is read, instructions to decompress the compressed image are given to the decompression processing unit 213, and therefore, the first rendering processing unit 211 at this time corresponds to a count unit configured to count the number of decompression instructions issued to the decompression processing unit 213. The initial value of the count value is "0" and in the case of the intermediate data in FIG. 6, at the time in point of reading the compressed image decompression command 607 corresponding to the object 403, the count value is "3". This count value is reset at the time of reading the page end command and returns to the initial value "0". That is, the number of counted compressed image decompression commands is reset for each page, not for each band.

At step 806, the first rendering processing unit 211 gives instructions to decompress a compressed image related to the read compressed image decompression command to the decompression processing unit 213. Upon receipt of the instructions, the decompression processing unit 213 decompresses the target compressed image and develops the decompressed image onto the RAM 102 as the decompressed image storage memory 220. On the completion of the decompression processing of the compressed image, the decompression processing unit 213 stores the number of decompression instructions for which the processing has been completed in the internal register. The initial value of the internal register is "0" and the count value is reset at the time of the termination of this flow and returns to "0" again. After the instructions to decompress the compressed image are given by the first rendering processing unit 211, the processing returns to step 801.

At step 807, the first rendering processing unit 211 derives the coordinate (X-coordinate) of an object to be drawn by the drawing command read at step 801 on a scan line on which the object is drawn. For example, in the case of the object 401 in FIG. 7, the X-coordinate at both the left end and the right end of a rectangle that forms the contour of the object 401 is derived. The coordinate information on the edge derived here is used in edge sort processing (step 901), to be described later. At this step, for one object, the edge coordinate of a portion belonging to another adjacent band (here, even-numbered band) is also derived. The reason is that the derivation of an edge coordinate on a certain scan line uses the edge coordinate on the scan line one before the certain scan line. For example, in the case where the coordinate of a certain edge is only shifted by Δx each time the scan line advances one, it is possible to easily find the coordinate of a derivation-target edge by adding Δx to the coordinate of the edge immediately before the certain edge. The drawing command for which the derivation of the edge coordinate has been completed as described above is spooled for the subsequent scan line processing.

At step 808, the first rendering processing unit 211 determines whether the command (command to be read next) that follows the drawing command spooled at step 807 is a drawing command based on the pointer. The reason is to perform the scan line processing to be performed later for a plurality of objects located in proximity to one another in the Y-coordinate direction together. In the case whether the next read-target command is a drawing command, the processing proceeds to step 809. On the other hand, in the case where the next read-target command is a command other than a drawing command, the processing proceeds to step 810.

At step 809, the first rendering processing unit 211 determines whether the drawing range of all the drawing commands spooled at the present point in time overlaps the drawing range of the next read-target drawing command in the Y-coordinate direction (sub scanning direction). In this case, all the drawing commands spooled at the present point in time include the drawing command spooled at the most recent step 807. The next read-target drawing command is only referred to for determination and not read actually. In this determination, it is checked whether there is an overlap between the range between the start Y-coordinate and the end Y-coordinate of the drawing range of one of the drawing commands currently spooled and the range between the start Y-coordinate and the end Y-coordinate of the drawing range of the next read-target drawing command. In the case where the results of the determination indicate that there is an overlap, the processing returns to step 801 and then whether or not there is an overlap with another object is further checked. On the other hand, in the case where there is no overlap, the processing proceeds to step 810 and then the scan line processing of the drawing range of the drawing commands spooled at the present point in time is performed.

Here, the actual flow until the execution of the scan line processing is determined is explained by taking the case of the intermediate data in FIG. 6 as an example. First, the compressed image decompression commands 603 and 604 of the two objects 401 and 402 are read and instructions to decompress the corresponding two compressed images are given (S801 to S805). Subsequently, the drawing command 605 of the object 401 is read and the edge coordinate thereof is derived, and the drawing command 605 is spooled (S807). The next read-target command is the drawing command 606 of the object 402, and therefore, whether or not there is an overlap in the Y-coordinate direction of the drawing range is checked and it is determined that there is an overlap (Yes at S809). Then, the drawing command 606 of the object 402 is read (S801) and the edge coordinates thereof are derived and the drawing command 606 is spooled (S807). At this point in time, the next read-target command is the compressed image decompression command 607 of the object 403, and therefore, the results of the determination at step 808 indicate "OTHER THAN DRAWING COMMAND" and the scan line processing of the two drawing commands 605 and 606 is performed together. Here, it is assumed that there exists a drawing command α of an object with, for example, a graphics attribute, which overlaps the objects 401 and 402 in the Y-coordinate direction, between the drawing command 606 and the compressed image decompression command 607. In this case, at the point in time at which the drawing command 606 is spooled, the next read-target command is the drawing command α of the graphics object and further, whether or not there is an overlap in the Y-coordinate direction of the drawing range is checked and it is determined that there is an overlap (Yes at S809). As a result of this, the drawing command α of the graphics object is read (S801) and the scan line processing of the three objects is performed together.

At step 810, the first rendering processing unit 211 performs the scan line processing for the drawing range corresponding to the drawing commands spooled at the present point in time. Here, bitmap image data of the areas of the odd-numbered bands (in the example in FIG. 7, the first band, the third band, and the fifth band) is generated. Details of the scan line processing will be described later.

At step 811, the first rendering processing unit 211 performs processing based on a command (drawing frame setting command, drawing area setting command, etc.) other than the drawing command and the compressed image decompression command. For example, the setting of the number of tone levels of a processing-target page is performed based on the drawing frame setting command 601. As can be seen from the intermediate data in FIG. 6, the drawing frame setting command and the drawing area setting command are performed in the first stage of the rendering processing.

At step 812, the first rendering processing unit 211 determines whether the processing has been completed for all the commands within the intermediate data. In the case where there is an unprocessed command, the processing returns to step 801 and the next command is read. That there is an unprocessed command means that there is left a command other than the page end command.

The above is the contents of the first rendering processing of odd-numbered band areas that the first rendering processing unit 211 is in charge of. There may be a configuration in which the first rendering processing unit is in charge of even-numbered bands.

(Scan Line Processing)

Figure 9:
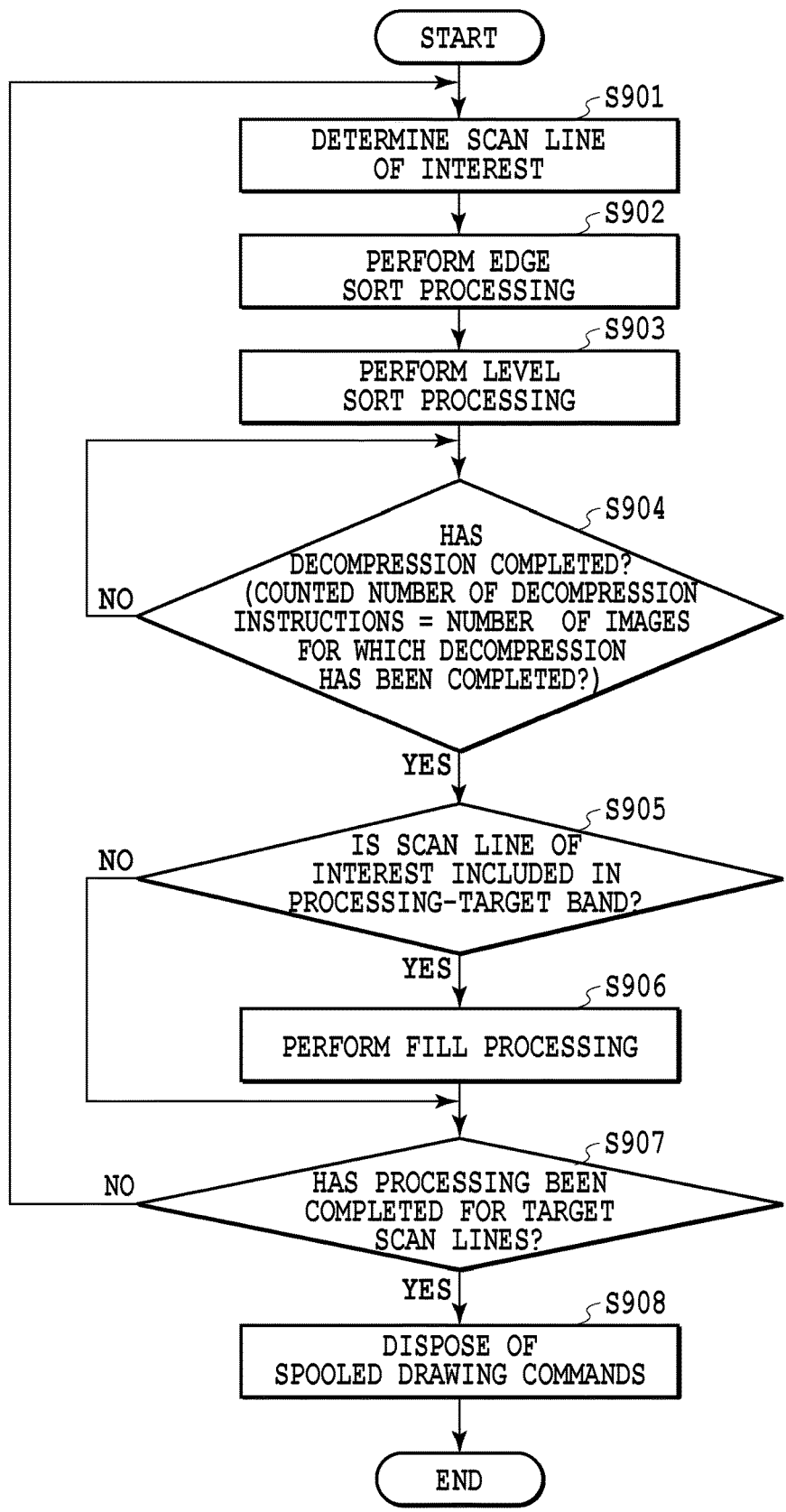
FIG. 9 is a flowchart showing details of scan line processing.

Subsequently, details of the scan line processing at step 810 described above are explained. This processing is performed for each scan line in the order from the scan line with the start Y-coordinate within the drawing range corresponding to the spooled drawing commands of two or more objects gathered in the Y-coordinate direction. In the following, the scan line that is a target of the processing of the scan lines within the drawing range is referred to as a "scan line of interest". FIG. 9 is a flowchart showing details of the scan line processing. In the following, explanation is given in accordance with the flow in FIG. 9.

At step 901, a scan line of interest is determined from the scan lines within the drawing range corresponding to the spooled drawing commands. In the stage immediately after the processing starts, the scan line with the start Y-coordinate is determined to be a scan line of interest as described above.

At step 902, the edge sort processing is performed for the scan line of interest. Specifically, first, one or a plurality of objects that appears on the scan line of interest is specified. Then, from the edge coordinates derived at step 807 described previously, the edge coordinates on the scan line of interest are acquired for the specified objects and the specified objects are rearranged in the ascending order of the X-coordinate. By this rearrangement, it is made possible to generate the pixel value in the bitmap image data in the ascending order of the X-coordinate.

At step 903, level sort processing is performed for the scan line of interest. Specifically, objects that affect the color of the pixel between edges (span) arranged in order at step 902 are further specified and the specified objects are rearranged in the order of the level.

At step 904, whether the decompression processing has been completed for all the compressed images instructed to be decompressed is determined. Specifically, the number of decompression instructions (count value) obtained at step 805 described previously is compared with the count value (number of images for which the decompression processing has been completed) of the internal register of the decompression processing unit 213. In the case where the count value of the internal register of the decompression processing unit 213 is smaller than the count value of the number of decompression instructions, the comparison is repeated (e.g., at fixed intervals) until both count values become equal. It may also be possible to make the comparison, for example, each time the decompression processing for one compressed image is completed in place of making the comparison at fixed intervals. In the case where the results of the comparison such as this indicate that both count values are equal, the processing proceeds to step 905. In the case of the scan line processing of the two drawing commands 605 and 606 described previously, the number of compressed image decompression commands read at step 805 is "2", and therefore, in the stage where the count value (number of images for which the decompression processing has been completed) of the internal register becomes "2", the processing proceeds to step 905.

At step 905, whether the scan line of interest is included in the processing-target band (here, odd-numbered band) is determined. In the case where the scan line of interest is included in the processing-target band, the processing proceeds to step 906. On the other hand, in the case where the scan line of interest is included in a non-processing-target band (here, even-numbered band), the processing proceeds to step 907.

At step 906, fill processing to generate the pixel value in the bitmap image data is performed for the scan line of interest. In the case of the present embodiment where the drawing-target object is the photo object of a compressed image, the data of the decompressed image developed onto the decompressed image storage memory 220 is read and the pixel value is generated for each span based on the objects sorted according to level. The generated pixel value is stored in the RAM 102 as the pixel value in the bitmap image data of the processing-target page.

At step 907, whether the processing for the scan lines within the drawing range corresponding to the spooled drawing commands has been completed is determined. In the case where there is an unprocessed scan line, the processing returns to step 901 and the processing is continued by determining the next scan line of interest. On the other hand, in the case where the processing has been completed, the processing proceeds to step 908 and the spooled drawing commands are disposed of and the present processing is exited.

Figure 10:
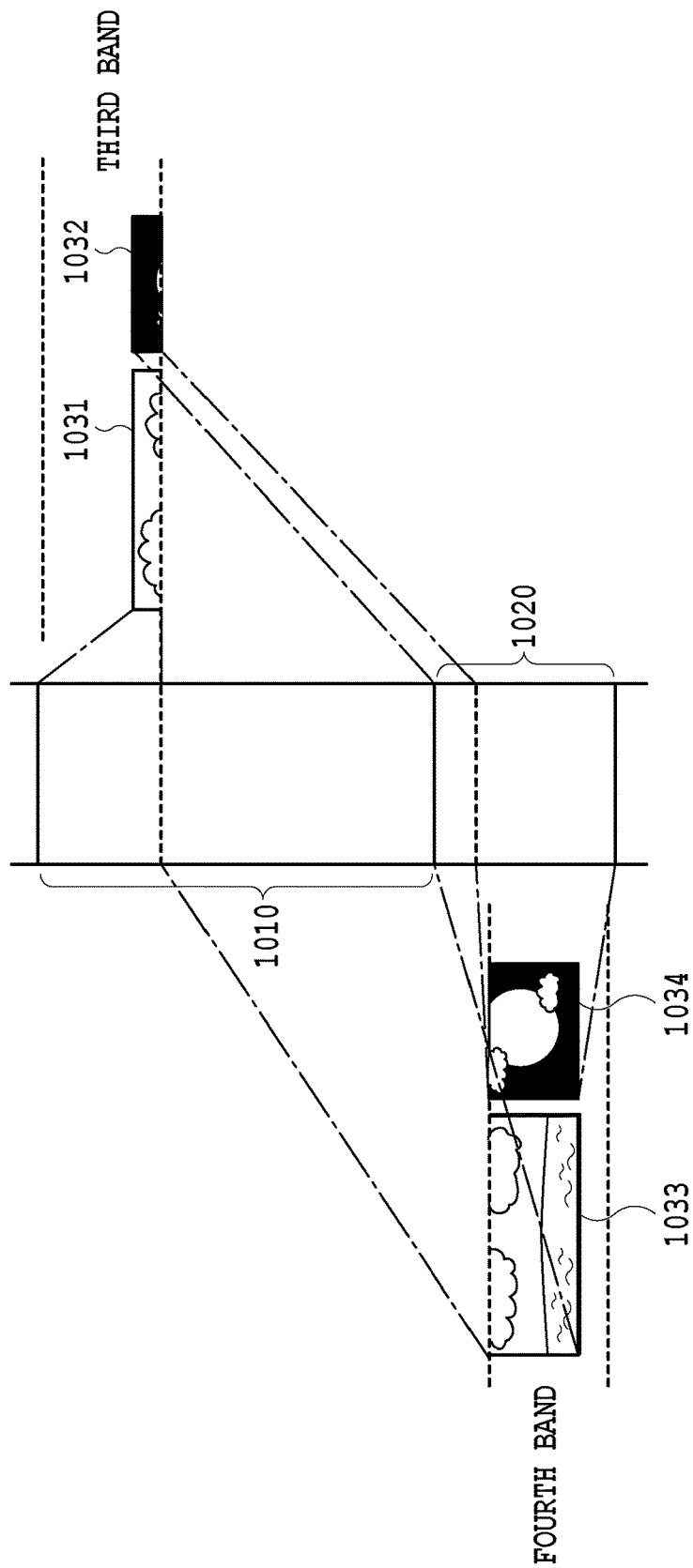
FIG. 10 is a diagram showing the way image data is stored within a decompressed image storage memory.

Here, specific explanation is given by taking the scan line processing of the third band in FIG. 7 as an example. FIG. 10 is a diagram showing the way image data is stored within the RAM 102 as the decompressed image storage memory 220. In FIG. 10, an area 1010 is an area secured to store image data decompressed by the compressed image decompression command 603 and an area 1020 is an area secured to store image data decompressed by the compressed image decompression command 604. As described above, two areas are secured in succession within the RAM 102. The area 1010 is also referred to in second rendering processing, to be described later, and necessary image data is read. The first rendering processing unit 211 reads image data for which the decompression by the compressed image decompression commands 603 and 604 has been completed from the RAM 102 based on the drawing commands 605 and 606. At this time, what is read by the first rendering processing unit 211 is only the image data existing within the area of the third band. Now, in the third band, the two objects exist: the object 401 and the object 402. For example, in the case of the object 401, first, from the start coordinates and the width and height of a rectangular area represented by a path point series included in the drawing command 605, the image data size within the area of the third band is calculated. Here, the width of the object 401 is 2,304−256=2,048 pixels and the height corresponding to ¼ of the whole of the object 401 is 3,072 (1,024×3)−2,816=256 pixels. Then, there are three channels for RGB, and therefore, the image data size of the object 401 within the area of the third band will be 2,048× 256×3=1,572,864 bytes (gradation 8-bit: 0x180000). Then, the value (0x02000000+0x18000=0x02180000) obtained by adding the calculated image data size described above to the initial address of the decompressed image is the initial address of the fourth band of the object 401. In the first rendering processing, pixels up to the last pixel of the third band of the object 401 are used. Consequently, in the first rendering processing, the read of 0x02180000 and subsequent addresses of the object 401 is omitted. The address of the last pixel of the third band of the object 401 is obtained by subtracting one pixel (3 bytes) from the initial address of the fourth band, i.e., (0x02180000)−one pixel (3 bytes) =0x217FFFD. The last address of the data used in the first rendering processing is obtained by subtracting one byte from the initial address of the fourth band, i.e., (0x02180000)−one byte=0x217FFFF. As described above, in the present embodiment, it is possible to reduce the processing cost by omitting part of the read image data. The series of processing such as this is similarly performed for the object 402. As a result of this, the image data of partial images 1031 and 1032 corresponding to the uppermost quarter of the objects 401 and 402 included in the third band, which is the processing-target band, is read. Then, the first rendering processing unit 211 performs the fill processing for the read partial image data. The pixel values of the portion corresponding to the partial images 1031 and 1032 generated by the fill processing are stored in the RAM 102. The final bitmap image data is made up of the pixel values generated by the first rendering processing and the pixel values generated by the second rendering processing, to be described later. That is, the pixel values of the bitmap image data for each page obtained by the band parallel rendering processing according to the present embodiment are a set of the pixel values generated by the two rendering processing units, respectively.

The above is the contents of the scan line processing in the first rendering processing unit 211.

(Second Rendering Processing)

Figure 11:
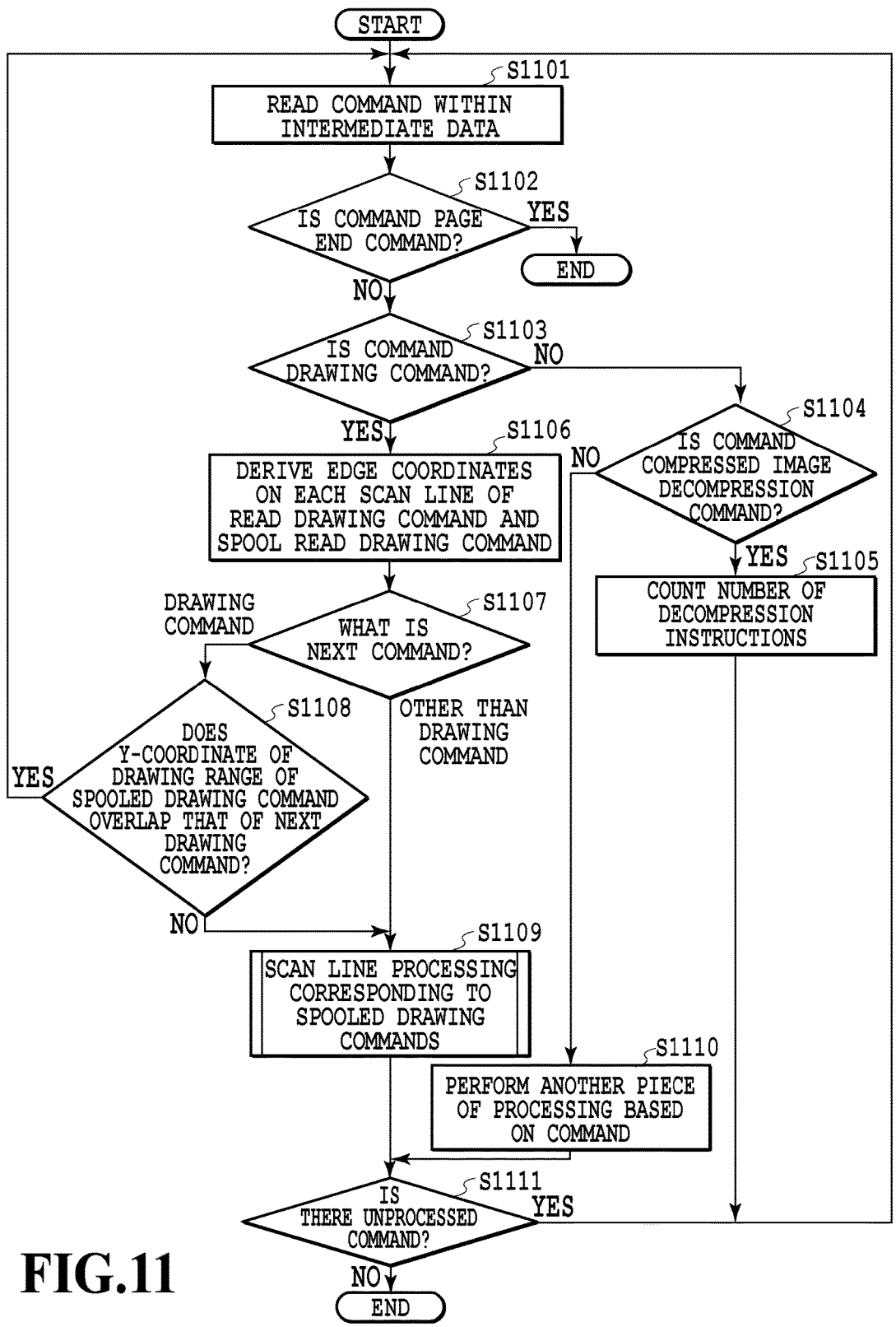
FIG. 11 is a flowchart showing a flow of second rendering processing.

Next, the rendering processing (second rendering processing) of the second band (here, even-numbered band), which the second rendering processing unit 212 is in charge of, is explained. FIG. 11 is a flowchart showing a flow of the second rendering processing according to the present embodiment. The contents of the flowchart are basically the same as the contents of the flowchart in FIG. 8 showing the flow of the first rendering processing except that the processing-target band is an even-numbered band. The main difference lies in that in the second rendering processing, in the case where a compressed image decompression command is read, only the number of decompression instructions is counted and the decompression instructions based on the compressed image decompression command are not given to the decompression processing unit 213. In the following, in accordance with the flowchart in FIG. 11, the feature portion of the second rendering processing is explained mainly.

Steps 1101 to 1105 correspond to steps 801 to 805 in the flow in FIG. 8 described previously. The intermediate data that is read at step 1101 is the same as the intermediate data that is read by the first rendering processing unit 211. As described above, the contents of this flow are also that the number of read compressed image decompression commands (number of decompression instructions) is counted (S1105), but after this, the decompression instructions are not given to the decompression processing unit 213 and the processing returns to step 1101.

Steps 1106 to 1111 correspond to steps 807 to 812 in the flow in FIG. 8 described previously. The contents of the scan line processing at step 1109 are also the same as the contents shown in the flow in FIG. 9 described previously, but the second rendering processing differs from the first rendering processing in that the processing-target band is an even-numbered band. That is, by the determination (S905) of whether the scan line of interest is included in the processing-target band in the flow in FIG. 9, whether the band is an even-numbered band is determined and the fill processing (S906) is performed for the band area of an even-numbered band.

Here, by using FIG. 10 again, the scan line processing of the fourth band in FIG. 7 is explained. The second rendering processing unit 212 also reads image data for which decompression by the compressed image decompression commands 603 and 604 has been completed from the RAM 102 based on the drawing commands 605 and 606. At this time, what is read by the second rendering processing unit 212 is only the image data existing within the area of the fourth band. That is, the image data of partial images 1033 and 1034 corresponding to the lowermost three quarters of the objects 401 and 402 included in the fourth band, which is the processing-target band, is read.

The read of the partial images 1033 and 1034 is performed by directly accessing the data address of the portion corresponding to the fourth band of the target image data. The calculation method of the data address is the same as that in the first rendering processing and the data address is calculated from the data size of the image data, the initial address, the band area, etc.

For example, the image data of the object 401 existing within the area of the fourth band is read from 0x02180000. From the path point series (2304, 3840) of the object 401, it is known that the last pixel of the object 401 exists within the area of the fourth band. Because of this, in the second rendering processing, it is sufficient to read the image data of the object 401 from 0x02180000 to the last address. The last address of the image data of the object is 0x025FFFFF and the address of the last pixel of the object 401 is 0x025FFFFD.

Consequently, in the second rendering processing, the read of the addresses before 0x02180000 of the object 401 is omitted. This is called an address jump. As described above, in the present embodiment, it is possible to reduce the processing cost by omitting part of the read of image data. The series of processing such as this is similarly performed for the object 402.

Then, the second rendering processing unit 212 performs the fill processing for the read partial image data. The pixel values of the portion corresponding to the partial images 1033 and 1034 generated by the fill processing are stored in the RAM 102.

The above is the contents of the scan line processing in the second rendering processing unit 212.

In the present embodiment, the case is explained where there are two rendering processing units. However, the number of rendering processing units only needs to be two or more and is not limited to two. For example, in the case where there are three rendering processing units, one of the rendering processing units gives instructions to decompress a compressed image to the decompression processing unit and the other rendering processing units refer to the necessary portion of the decompressed image and perform rendering processing. That is, it is only required to design a configuration in which each rendering processing unit uses one decompressed image in a sharing manner.

According to the present embodiment, each of a plurality of rendering processing units reads common intermediate data and performs band parallel rendering processing while using decompression results of a compressed image across band areas each of which each rendering processing unit is in charge of in a sharing manner. Because of this, parallel processing is enabled even for a compressed image existing across band areas within PDL data without the need to decompress the compressed image in advance in the analysis stage of the PDL data and in the generation stage of intermediate data and to divide the image into images so that each divided image is included in each band area. Due to this, even in the case where a compressed image exists across the band boundary within PDL data, it is possible to suppress a delay of the start of rendering.

(Second Embodiment)

In the first embodiment, the aspect is explained in which one of a plurality of rendering processing units operating in parallel gives instructions to decompress a compressed image and the other rendering processing unit also uses the image decompressed by the decompression instructions. Next, an aspect is explained as a second embodiment in which each of a plurality of rendering processing units operating in parallel has a decompression processing unit and a decompressed image storage memory. The basic apparatus configuration and processing flow are the same as those of the first embodiment, and therefore, in the following, a different point is explained.

Figure 12:
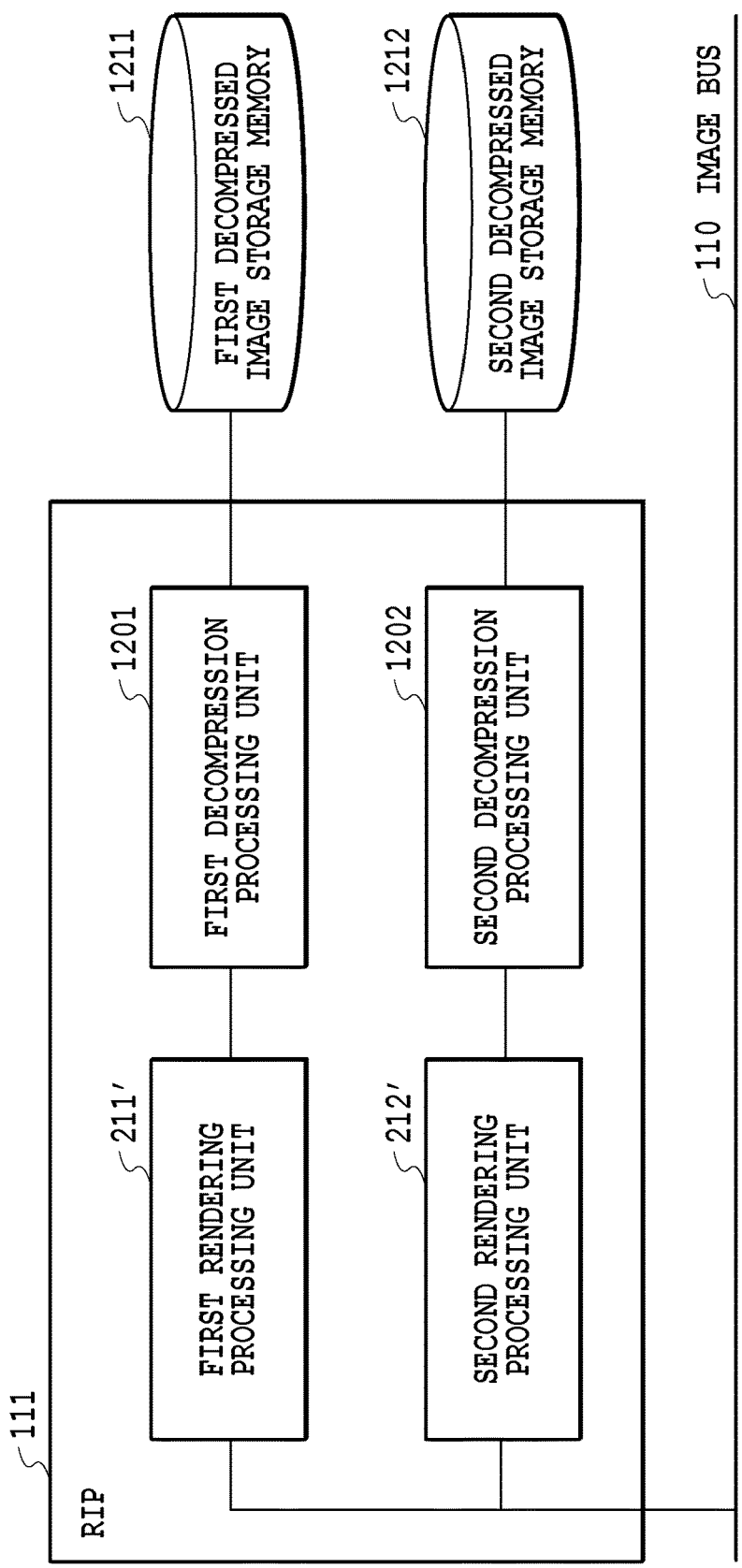
FIG. 12 is a diagram showing a hardware configuration example of a RIP according to a second embodiment.

FIG. 12 is a diagram showing a hardware configuration example of the RIP 111 according to the present embodiment. The RIP 111 of the present embodiment has a first rendering processing unit 211' and a second rendering processing unit 212' and has a first decompression processing unit 1201 and a second decompression processing unit 1202 corresponding to each rendering processing unit. Further, a first decompressed image storage memory 1211 and a second decompressed image storage memory 1212 are provided corresponding to each decompression processing unit and image data after being decompressed by each decompression processing unit is stored in the first and second decompressed image storage memories 1211 and 1212, respectively.

Then, in the case of the present embodiment, both the first rendering processing unit 211' and the second rendering processing unit 212' perform the flow (i.e., the flow including the step of giving decompression instructions to the decompression processing unit) shown in FIG. 8 described previously. The final bitmap image data is made up of the pixel values generated by the first rendering processing unit 211' and the pixel values generated by the second rendering processing unit 212'. That is, the pixel values of the bitmap image data for each page obtained by the band parallel rendering processing according to the present embodiment are also a set of the pixel values generated by the two rendering processing units, respectively.

In the case of the present embodiment also, the number of rendering processing units only needs to be two or more and is not limited to two. For example, in the case where there are three rendering processing units, each rendering processing unit performs the decompression processing of a compressed image relating to the band area that each rendering processing unit itself is in charge of by using the decompression processing unit provided corresponding to each rendering processing unit. Then, each rendering processing unit refers to the necessary portion of each decompressed image and performs the rendering processing. That is, it is only required to design a configuration in which each rendering processing unit individually generates and uses a decompressed image for each rendering processing unit itself.

According to the present embodiment, each rendering processing unit operating in parallel gives decompression instructions to the corresponding decompression processing unit and individually generates a decompressed image. Due to this, it is no longer necessary for each rendering processing unit to depend on the other rendering processing unit, and therefore, faster processing is enabled.

(Modification Example)

In the first embodiment, the aspect is explained in which a compressed image and instructions to decompress the compressed image are included within intermediate data. However, an image included within intermediate data may be a non-compressed image. A non-compressed image differs from a compressed image in being used for a drawing command without being subjected to decompression processing. A non-compressed image is managed by using the compression format (BITMAP), the data size, the data initial address, and the image ID. In the case of a non-compressed image, it is possible to make use of the data initial address as it is for address jump processing.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, even in the case where image data is included across the band boundary in a page of print data, it is possible to suppress a delay of the start of rendering of the page.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-052594 filed Mar. 16, 2016, and No. 2017-019571, filed Feb. 6, 2017, which are hereby incorporated by reference wherein in their entirety.

What is claimed is:

1. An image processing apparatus that uses a first rendering processor that performs rendering of a first area within a page based on print data and a second rendering processor that performs rendering of a second area within the page based on the print data, the image processing apparatus comprising:
   a controller, having a processor which executes instructions stored in a memory or having circuitry, being configured to:
      acquire image data arranged across the first area and the second area based on the print data;
      cause the first rendering processor having accessed the image data to perform rendering with pixels within the first area of all the pixels of the image data, wherein the image data in the first area is specified based on a memory address of an image data memory which stores the image data; and
      cause the second rendering processor having accessed the image data to perform rendering with pixels within the second area of all the pixels of the image data, wherein the image data in the second area is specified based on the memory address of an image data memory which stores the image data.

2. The image processing apparatus according to claim 1, wherein
   the controller includes a memory capable of storing the image data, and
   the controller causes:
   the first rendering processor to perform rendering with pixels within the first area of all the pixels of the image data based on memory address information on an initial pixel of a rectangular area in the first area of the image data and memory address information on a last pixel of a rectangular area in the first area of the image data; and
   the second rendering processor to perform rendering with pixels within the second area of all the pixels of the image data based on memory address information on an initial pixel of a rectangular area in the second area of the image data and memory address information on a last pixel of a rectangular area in the second area of the image data.

3. The image processing apparatus according to claim 2, wherein
the controller acquires memory address information on a specific pixel of the image data based on at least initial memory address information on the image data.

4. The image processing apparatus according to claim 2, wherein
the controller acquires memory address information on a specific pixel of the image data based on at least area information on the first area.

5. The image processing apparatus according to claim 2, wherein
the controller acquires address information on a specific pixel of the image data based on at least area information on the second area.

6. The image processing apparatus according to claim 2, wherein
the controller acquires memory address information on a specific pixel of the image data based on at least initial position information on the rectangular area of the image data.

7. The image processing apparatus according to claim 2, wherein
the controller acquires memory address information on a specific pixel of the image data based on at least channel information on the image data.

8. The image processing apparatus according to claim 2, wherein
the controller acquires memory address information on a specific pixel of the image data based on at least size information on the rectangular area of the image data.

9. The image processing apparatus according to claim 1, wherein
the first area is a predetermined band area of a plurality of band areas obtained by dividing the page for each band, and
the second area is a band area different from the predetermined band area of the plurality of band areas.

10. The image processing apparatus according to claim 1, wherein
the controller acquires image data in a raster format based on rendering results of the first rendering unit and rendering results of the second rendering unit.

11. The image processing apparatus according to claim 1, wherein
the controller includes a decompression circuit decompressing compressed image data of image data within the page by processing a decompress command prior to a drawing command, and
the controller causes the first rendering processor to perform rendering of the first area based on image data decompressed by the decompression circuit and causes the second rendering processor to perform rendering of the second area based on the image data decompressed by the decompression circuit.

12. The image processing apparatus according to claim 11, wherein
the controller includes a memory configured to store the image data decompressed by the decompression circuit, and
the controller causes the first rendering unit to perform rendering of the first area based on the decompressed image data stored in the memory and causes the second rendering unit to perform rendering of the second area based on the decompressed image data stored in the memory.

13. The image processing apparatus according to claim 11, wherein
the decompression circuit decompresses the compressed image data based on decompression instructions from one of the first rendering unit and the second rendering unit.

14. A method for controlling an image processing apparatus that uses a data generator to generate intermediate data for each page based on print data, a first rendering processor that performs rendering of a first area within a page based on the intermediate data, and a second rendering processor that performs rendering of a second area within the page based on the intermediate data, the method comprising the steps of:
causing the data generator to generate intermediate data of a page including compressed image data across the first area and the second area based on the print data;
causing the first rendering processor having accessed the image data to perform rendering with pixels within the first area of all the pixels of the image data obtained by decompressing the compressed image data, wherein the image data in the first area is specified based on a memory address of an image data memory which stores the image data; and
causing the second rendering processor having accessed the image data to perform rendering with pixels within the second area of all the pixels of the image data obtained by decompressing the compressed image data, wherein the image data in the second area is specified based on a memory address of the image data memory which stores the image data.

15. A non-transitory computer readable storage medium storing a program for causing a computer to perform a method for controlling an image processing apparatus that uses a data generator to generate intermediate data for each page based on print data, a first rendering processor that performs rendering of a first area within a page based on the intermediate data, and a second rendering processor that performs rendering of a second area within the page based on the intermediate data, the method comprising the steps of:
causing the data to generate intermediate data of a page including compressed image data across the first area and the second area based on the print data;
causing the first rendering processor having accessed the image data to perform rendering with pixels within the first area of all pixels of the image data obtained by decompressing the compressed image data, wherein the image data in the first area is specified based on a memory address of an image data memory which stores the image data; and
causing the second rendering processor having accessed the image data to perform rendering with pixels within the second area of all the pixels of the image data obtained by decompressing the compressed image data, wherein the image data in the second area is specified based on a memory address of the image data memory which stores the image data.

16. An image processing apparatus that performs rendering of a first area and a second area of a page based on print data, the image processing apparatus comprising:
a memory storing image data arranged across the first area and the second area;
a first rendering processor acquiring all pixels of the image data and performing rendering by using pixels within the first area of all the pixels of the image data, wherein the image data in the first area is specified based on a memory address of an image data memory which stores the image data; and a second rendering processor acquiring all the pixels of the image data and performing rendering by using pixels within the second area of all the pixels of the image data, wherein the image data in the second area is specified based on a memory address of an image data memory which stores the image data.

17. The image processing apparatus according to claim 16, wherein
the first rendering processor performs rendering with pixels within the first area of all pixels of the image data based on memory address information on an initial pixel of a rectangular area in the first area of the image data and memory address information on a last pixel of a rectangular area in the first area of the image data, and
the second rendering processor performs rendering with pixels within the second area of all pixels of the image data based on memory address information on an initial pixel of a rectangular area in the second area of the image data and memory address information on a last pixel of a rectangular area in the second area of the image data.

18. The image processing apparatus according to claim 17, wherein
memory address information on a specific pixel of the image data is acquired based on at least initial memory address information on the image data.

19. The image processing apparatus according to claim 17, wherein
memory address information on a specific pixel of the image data is acquired based on at least area information on the first area.

20. The image processing apparatus according to claim 17, wherein
memory address information on a specific pixel of the image data is acquired based on at least area information on the second area.

21. The image processing apparatus according to claim 17, wherein
memory address information on a specific pixel of the image data is acquired based on at least initial position information on the rectangular area of the image data.

22. The image processing apparatus according to claim 17, wherein
memory address information on a specific pixel of the image data is acquired based on at least channel information on the image data.

23. The image processing apparatus according to claim 17, wherein
address information on a specific pixel of the image data is acquired based on at least size information on the rectangular area of the image data.

24. The image processing apparatus according to claim 16, wherein
the first area is a predetermined band area of a plurality of band areas obtained by dividing the page for each band, and
the second area is a band area different from the predetermined band area of the plurality of band areas.

25. The image processing apparatus according to claim 16, wherein
image data in a raster format of the page is generated based on rendering results of the first renderer and rendering results of the second renderer.

26. The image processing apparatus according to claim 16 comprising:
a decompression circuit decompressing compressed image data of image data within the page, wherein
the first rendering processor performs rendering of the first area based on image data decompressed by the decompression circuit, and
the second rendering processor performs rendering of the second area based on image data decompressed by the decompression circuit.

27. The image processing apparatus according to claim 26 comprising:
a memory storing image data decompressed by the decompression circuit, wherein
the first rendering processor performs rendering of the first area based on the decompressed image data stored in the memory, and
the second rendering processor performs rendering of the second area based on the decompressed image data stored in the memory.

* * * * *